United States Patent
Skelbaek et al.

(10) Patent No.: US 6,444,242 B1
(45) Date of Patent: Sep. 3, 2002

(54) MICROENCAPSULATED OIL OR FAT PRODUCT

(75) Inventors: Tove Skelbaek, Vaerloese; Steen Andersen, Frederiksberg, both of (DK)

(73) Assignee: Danochemo A/S (DK)

( * ) Notice: Subject to any disclaimer, the term of this patent is extended or adjusted under 35 U.S.C. 154(b) by 1513 days.

(21) Appl. No.: 08/710,690

(22) Filed: Sep. 24, 1996

Related U.S. Application Data

(63) Continuation of application No. 08/360,655, filed as application No. PCT/DK93/00231 on Jul. 6, 1993, now abandoned.

(30) Foreign Application Priority Data

Jul. 6, 1992 (DK) ............................................. 0886/92

(51) Int. Cl.⁷ .............................. A23D 9/00; A23P 1/04
(52) U.S. Cl. ........................... 426/98; 426/99; 426/601; 426/613
(58) Field of Search ..................... 426/601, 99, 613, 426/98, 588

(56) References Cited

U.S. PATENT DOCUMENTS

| | | | |
|---|---|---|---|
| 3,968,261 A | | 7/1976 | Goodman .................... 426/98 |
| 4,670,285 A | | 6/1987 | Clandinin et al. .......... 426/602 |
| 4,911,946 A | * | 3/1990 | Singer ........................ 426/658 |
| 5,013,569 A | | 5/1991 | Rubin ........................ 426/585 |
| 5,096,730 A | * | 3/1992 | Singer ........................ 426/804 |
| 5,096,731 A | * | 3/1992 | Singer ........................ 426/804 |
| 5,102,681 A | * | 4/1992 | Singer ........................ 426/804 |
| 5,106,639 A | | 4/1992 | Lee et al. .................... 426/302 |
| 5,147,677 A | * | 9/1992 | Ziegler ....................... 426/804 |
| 5,171,603 A | * | 12/1992 | Singer ........................ 426/804 |
| 5,204,029 A | * | 4/1993 | Morgan ....................... 426/98 |
| 5,413,804 A | * | 5/1995 | Rhodes ....................... 426/804 |

FOREIGN PATENT DOCUMENTS

| | | | |
|---|---|---|---|
| EP | 231904 | 8/1987 | |
| EP | 385081 | 9/1990 | |
| EP | 424578 | 5/1991 | |
| EP | 425213 | 5/1991 | |
| GB | 2217173 | 10/1989 | |
| GB | 2240702 | 8/1991 | |
| JP | 60-37934 | * 2/1985 | ................ 426/98 |
| JP | 85-49097 | 3/1985 | |
| JP | 90-305898 | 12/1990 | |
| WO | WO 92/05708 | * 4/1992 | |

OTHER PUBLICATIONS

Food Engineering Nov. 1968 Microencapsulation pp. 88–91.*
Patton 1976 Biomedical Aspects of Lactation Pergamon Prers New York pp. 4–7, 93, 94.*
Sangh et al., "Reconstitution behavior of spray–dried . . . ", Indian J. Dairy Sci., vol. 45, No. 5, 1992.

* cited by examiner

*Primary Examiner*—Carolyn Paden
(74) *Attorney, Agent, or Firm*—Keil & Weinkauf

(57) ABSTRACT

The invention relates to a microencapsulated oil or fat product, wherein at least one oil or fat is dispersed in the matrix material as particles or drops having an average diameter of less than or equal to 2 μm, the oil or fat containing at least 10% by weight of highly unsaturated fatty acid, preferably ω-3 and ω-6 fatty acids, the level of free fatty acids being below 5.0% by weight and preferably below about 0.5% by weight, and the matrix material consisting of caseinate and optionally at least one carbohydrate.

19 Claims, No Drawings

MICROENCAPSULATED OIL OR FAT PRODUCT

This application is a continuation of U.S. application Ser. No. 08/360,655, filed on Dec. 22, 1994, now abandoned, which was the National Stage of International Application No. PCT/DK93/00231, filed Jul. 6, 1993.

BACKGROUND OF THE INVENTION

The present invention relates to a microencapsulated oil or fat product containing at least one highly unsaturated fatty acid or a derivative thereof, a process of preparing the microcapsules and the use of the microencapsulated product in an infant formula and other functional foods.

Fat and oil products containing significant amounts of highly unsaturated fatty acids have recently been shown to possess valuable nutritional properties. Thus, U.S. Pat. No. 4,670,285 describes an aqueous infant formula and an edible fat product for incorporation into an infant formula comprising highly unsaturated $C_{20}$ or $C_{22}$, ω-6 fatty acids and $C_{20}$ or $C_{22}$, ω-3 fatty acids which are considered to be of vital importance for the synthesis of structural lipids in the human brain. It also appears from said U.S. Pat. No. 4,670,285 that infants and especially premature infants are unable to synthesize such unsaturated fatty acids in sufficient quantities.

EP-B1-231904 discloses a method for preparation of a fat mixture for infant feeds containing arachidonic and docosahexaenoic acid in a ratio of 2:1 to 3:1. According to the method various vegetable and animal fats or oils are heated, blended to obtain the desired fatty acid composition and stabilised by the addition of ascorbylic palmitate or alpha-tocopherol. The fat mixture can be used in the preparation of liquid or pulverized infant formulas.

Lipids containing unsaturated fatty acids, such as $C_{20:4}$ and $C_{22:4}$, ω-6, $C_{20:5}$, ω-3 and $C_{22:3}$, ω-3, degrade easily under production of unpleasant tasting aldehydes (Pokorny, J. (1976) Effect of Non-lipidic Substances on Rancid Off Flavour of Lipids in Paoletti, R. et al. (eds.) Lipids, Vol. 2: Technology, p. 475–481, Raven Press, New York, 1976).

Thus, it is necessary to protect such lipids in e.g. food products from oxygen, trace metals and other substances which attack the double bonds of the highly unsaturated fatty acids in order to avoid off-flavour and loss of physiological activity and to increase the shelf life of products containing them. More specifically, there is a need to provide microencapsulated fats or oils, such as vegetable and marine oils, wherein the highly unsaturated fatty acids are present in a digestible, shelf stable and undegradable form, preferably in a free flowing powdered form to be readily mixed with other dry or liquid components to form a nutritionally satisfying product, such as an infant formula, without the use of undesired additives.

GB-A-2,240,702 discloses a process for preparing fatty fodder additives with high content of ω-3 fatty acids wherein a fat, e.g. fish oil, is heated to from 20 to 50° C. with addition of an emulsifier such as monoglyceride or diglyceride to obtain an emulsion which is mixed with a carrier material such as casein and homogenized. The resulting emulsion is dried in a spray drier or in a fluid bed drier to obtain a powder.

JP patent publication No. 85-49097 discloses a powdered marine animal oil containing highly unsaturated fatty acids encapsulated in 3 to 40% of casein or caseinate, 3 to 60% of a saccharide, 1 to 5% of an emulsifier and 0 to 2% of microcrystalline cellulose.

U.S. Pat. No. 5,013,569 discloses an infant food formulation and a powder or liquid concentrate for preparing an infant food formulation comprising the fatty acids DHA and EPA in a ratio of approximately 3:2, wherein the DHA and EPA may be protected from oxidisation by exposure to ambient air by encapsulation. Suitable matrix materials are materials approved by the US Food and Drug Administration, i.e. compounds of the GRAS list, especially starches, cellulosic compounds and gums.

JP patent publication No. 90-305898 discloses powders of oils, such as fish oils, containing highly unsaturated fatty acids, obtained by spray drying an emulsion of said oils in a solution of a partial hydrolysate of casein at a hot air temperature of 140° C. The casein should be hydrolysed to a degree of from 5 to 20% in a protease catalyzed reaction in order to be a satisfying emulsifier. The powders obtained contain fatty oil in an amount of from 50 to 70%. It appears that sodium caseinate is an unsuitable emulsifier.

EP-A2-0 385 081 discloses the preparation of double encapsulated fat or oil emulsion products. The encapsulation method requires the film forming material, e.g. caseinate, to be added in two separate steps to an aqueous dispersion of an oil such as coconut oil, peanut oil or sunflower oil, to form an additional coating layer to obtain the desired oxidation resistance.

Singh, M. N.; Mathur, B. N. 1992. Indian J. Dairy Sci., 45, 5, p. 251–255, describe encapsulation of milk fat and vegetable oils in a matrix comprising whey proteins and mixtures of caseins and whey proteins. Due to the water insoluble nature of caseins, these proteins are used in various mixtures with the water soluble whey proteins in order to obtain a water dispersable dry product. It was concluded that encapsulation of fat globules with whey protein rather than casein improved the physical performance of the product.

None of the above citations discloses suitable powdered, protected lipid products, wherein the oil or fat contains at least 10% by weight of highly unsaturated fatty acid, preferably ω-3 and ω-6 fatty acids, or a derivative there of, which satisfy the requirements of the European Community to ingredients, such as encapsulation materials and emulsifiers, in infant formulas as published by the Commission of the European Community (EC) in a directive of May 14, 1991. U.S. Pat. No. 5,013,569 suggests the use of gums and starches as wall material. However, gums, such as gum arabic, have been shown to inhibit mineral uptake in infants and the EC-allowed starches are unsuitable as matrix materials, because these starches cannot emulsify the fat or oil.

Caseinate is a water soluble proteinaceous film forming material which is a valuable nutrient, especially for infants. However, previous attempts to use caseinate as an encapsulation material for oil or fat has shown poor emulsifying properties (sodium caseinate, cf. JP 90-305898). Furthermore, EP-A2-0 385 081 shows the need for an additional coating layer when encapsulating oils and using caseinate as encapsulating material resulting in a less economic process.

EP-A1-0,424,578 discloses a free flowing particulate composition comprising from 70 to 95% of lipid e.g. fish oil containing from 10 to 50% of free fatty acids encapsulated in caseinate, preferably sodium caseinate. It appears from EP-A1-0 424 578 that the free fatty acid level must be above 10% by weight of the lipid in order to avoid leakage of lipid from a caseinate-protected product and it is considered important to homogenise an acidic lipid and an aqueous caseinate solution together at a temperature of at least 50° C.

The emulsion is prepared by using a high-pressure ultrasonic homogeniser at a pressure of 14 to 16 bar. However, the free fatty acid level of natural animal and vegetable oils is normally below about 0.5–5.0% and the presence of free fatty acids in a food product is considered deleterious to the stability of the product.

EP-A2-0 425 213 discloses a microencapsulated lipid protected in a combination of caseinate and starch, said lipid being emulsified at a pressure of 1500 p.s.i. (103.4 bar) to 1700 p.s.i. (117.2 bar) and protected against leakage.

The above citations do not disclose a microencapsulated oil or fat product, wherein at least one oil or fat is dispersed without the use of emulsifiers in the matrix material as particles or drops having an average diameter of less than or equal to 2 $\mu$m, the oil or fat containing at least 10% by weight of highly unsaturated fatty acid, preferably $\omega$-3 and $\omega$-6 fatty acids, the level of free fatty acids being below 5.0% by weight and preferably below about 0.5% by weight, and the matrix material consisting of caseinate and optionally at least one carbohydrate.

SUMMARY OF THE INVENTION

It is therefore an object of the invention to provide a microencapsulated oil or fat product, wherein at least one oil or fat is dispersed in the matrix material as particles or drops having an average diameter of less than or equal to 2 $\mu$m, the oil or fat containing at least 10% by weight of highly unsaturated fatty acid, preferably $\omega$-3 and $\omega$-6 fatty acids, the level of free fatty acids being below 5.0% by weight and preferably below about 0.5% by weight, and the matrix material consisting of caseinate and optionally at least one carbohydrate. Said microencapsulated oil or fat product being stable for at least one year.

The microencapsulated oil or fat product of the invention can be used in foods, such as infant formulas, health functional foods, dietetic foods and pharmaceuticals, wherein a high content of a vegetable, animal or marine fat or oil containing at least one highly unsaturated fatty acid (HUFA) or a derivative thereof and wherein the content of free fatty acids is below 5% by weight, is desired. The caseinate containing matrix material according to the invention is in itself a natural infant nutrient which does not contain any additives or the like and wherein the fat or oil is protected against degradation.

It is a further object to provide a microencapsulated vegetable, animal or marine fat or oil encapsulated in a caseinate based matrix material, wherein the ratio between AA and/or $\gamma$-linolenic acid, EPA and DHA is from 0.1:0.1:1 to 3:1:1 which corresponds to the ratio normally found in human milk.

The invention further provides a process of preparing a microencapsulated oil or fat product, wherein a mixture of an oil or fat having a content of at least 10% by weight of highly unsaturated fatty acid, preferably $\omega$-3 and $\omega$-6 fatty acids, or a derivative thereof and an aqueous solution of a caseinate and, optionally, carbohydrate containing matrix material is homogenised at a pressure of more than 200 bar, preferably more than 230 bar and more preferably more than 300 bar, and the resulting emulsion is dried using methods known per se to obtain free flowing microcapsules. The microcapsules thus prepared preferably contain fat or oil in an amount of from 10 to 65% by weight and free fatty acids in an amount of less than 5% by weight, preferably less than 0.5% by weight.

The use of caseinate as matrix material in the process according to the invention presents the following advantages:

A free flowing microencapsulated product having a relatively high content of fat or oil and being nutritionally acceptable is obtained, because caseinate is in itself a protein nutrient which is preferred for feeding infants.

It is possible in a one step emulsifying process to obtain a stable emulsion using caseinate as encapsulating material and as the only emulsifying agent and when the fat or oil to be emulsified comprises less than 5% by weight of free fatty acids, preferably less than 1% and more preferably less than 0.5% by weight of free fatty acid. Thus, the process of the invention makes it possible to prepare a stable emulsion using a milk protein without the use of e.g. enzymes to first hydrolyse the protein or without the use of a fat or oil having an undesired high content of free fatty acids without the use of undesired additives, such as emulsifiers.

DESCRIPTION OF THE PREFERRED EMBODIMENTS

A preferred embodiment of the microencapsulated product of the invention has the following composition:

10 to 65, preferably 20 to 35 and more preferably 25% by weight of an oil or fat containing 0–75% of arachidonic acid ($C_{20:4}$ $\omega$-6, AA), 0–50% of eicosapentaenoic acid ($C_{20:5}$ $\omega$-3, EPA) and 0–100% of docosahexaenoic acid ($C_{22:6}$ $\omega$-3, DHA), 1 to 90, preferably 1 to 70 and more preferably 2 to 20% by weight of caseinate selected from the group consisting of sodium, potassium and calcium caseinate, 0 to 89, preferably 0 to 70, more preferably 20 to 70 and most preferably 30% by weight of a carbohydrate selected from the group consisting of glucose syrup, maltodextrin, saccharose, maltose or lactose.

0 to 10, preferably 5–6% by weight of at least one antioxidant selected from the group consisting of vitamin antioxidants, such as $\alpha$-, $\beta$-, $\gamma$- and $\delta$-tocopherols; ascorbic acid and derivatives thereof; carotenoids; and rosemary extract, 15 to 35, preferably 20 to 25% by weight of a spraying agent selected from the group consisting of corn starch; milk proteins, including casein, caseinate and whey proteins; preboiled or gelatinised starch; soy bean protein isolates; lactose; tricalcium phosphate; and calcium carbonate when a modified spray drying process is used. Spraying agent is not used in a normal spray drying process.

In a preferred embodiment of the process according to the invention 10–65%, preferably 20–35, more preferably 25% by weight of the microencapsulated product of a fat or oil or a mixture of a fat or oil containing 0–75% of arachidonic acid ($C_{20:4}$ $\omega$-6, AA), 0–50% of eicosapentaenoic acid ($C_{20:5}$ $\omega$-3, EPA) and 50–100%, preferably 0–100%, of docosahexaenoic acid ($C_{22:6}$ $\omega$-3, DHA), and an aqueous solution of from 1–98% caseinate, preferably 1–100%, more preferably 1–70%, and most preferably from 2–20% by weight of dry matter in solution, preferably sodium, potassium or calcium caseinate, most preferably potassium caseinate, is homogenised using a high-pressure homogenisator operated at 200 to at least 1000 bar, preferably from 230–300 to at least 1000 bar to obtain an emulsion wherein the oil drops have a diameter of from 0.01 to 5 $\mu$m. Preferably more than 90% and more preferably more than about 95% of the oil drops have a diameter of from 0.01 to 2 $\mu$m. The resulting emulsion is spray dried, preferably in a modified spray drying process at a hot air temperature of 70° C. preferably under supply of a spraying agent, such as corn starch, powdered milk proteins, etc., to obtain a free flowing microencapsulated product having a particle diameter of from 10 to 600 μm. When prepared in this manner the fat or oil is present in the emulsion or microcapsules in the form of drops having an average diameter of from 0.01 to 5 μm, preferably more than 95% of the oil drops having a diameter of from 0.01 to 2 μm more preferably from 0.01 to 1 μm.

The emulsion may further contain 0–95%, preferably from 0 to 70% by weight and more preferably 20–70% of the dry product of a carbohydrate, preferably glucose syrup, maltodextrin, saccharose, maltose or lactose, most preferably maltodextrin or saccharose, and 0–15%, preferably 5 to 6% of the dry product of a vitamin antioxidant, preferably mix-tocopherol or ascorbic acid.

Although caseinate may be used as the only matrix material it is preferred to use a combination of caseinate and carbohydrate as matrix material. It has been found that a weight ratio between caseinate and carbohydrate of from 1:4 to 1:1 provides better mechanical stability to the microencapsulated product as well as a minimized proportion of free oil on the microcapsules.

The use of more than 65% by weight of fat or oil in the microencapsulated product and process according to the invention would result in a sticky product due to fat or oil residues on the surface of the microcapsules.

The term "highly unsaturated fatty acids" (HUFA) refers to nutritionally valuable fatty acids having at least 18 carbon atoms and having at least 3 double bonds. Preferred are α-linolenic acid ($C_{18:3}$ ω-3, α-LNA), γ-linolenic acid ($C_{18:3}$ ω-6, γ-LNA), arachidonic acid ($C_{20:4}$ ω-6, AA), eicosapentaenoic acid -($C_{20:5}$ ω-3, EPA), docosapentaenoic acid (22:5 n-3, DPA) and docosahexaenoic acid ($C_{22:6}$ ω-3, DHA), more preferred are γ-LNA, AA, EPA and DHA, most preferred are AA, EPA and DHA. The fatty acids are normally present in natural oils as fatty acid esters of glycerol.

The fat or oil used in the microcapsules of the invention can be any fat or oil containing at least 10% by weight of HUFA, such as vegetable oil, e.g. evening primrose oil, borage oil, black currant seed oil, poppy seed oil; animal oil, e.g. egg yolk oil; single cell oil, e.g. alga oil; marine oil, e.g. fish oil. In the method according to the invention is preferably used mixtures of fat or oil, such as vegetable and fish oils to obtain a ratio between AA, EPA and DHA which equals the ratio in human milk. The fat or oil may be natural, fermented and/or enzymatically reesterified or chemically modified oil or fat.

Examples of additional matrix materials for use in the microcapsules according to the invention are preboiled or gelatinised starch.

Examples of antioxidants for use in the microcapsules of the invention are the vitamin antioxidants, α-, β-, γ- and δ-tocopherols, ascorbic acid and derivatives thereof, carotenoids, and rosemary extract. The antioxidants can be used in an amount of from 0 to 10% and preferably from 5 to 6% by weight of the final product. When hydrophilic antioxidants are used, such as ascorbic acid, these are preferably added to the solution of the matrix material and when lipophilic antioxidants are used, such as α-tocopherol, these are preferably added together with the fat or oil.

Examples of spraying agents for use in the modified spray drying process are powders of corn starch, milk proteins, preboiled or gelatinised starch, soy bean protein isolates, lactose, tricalcium phosphate, and calcium carbonate.

The emulsion prepared according to the invention is stable for at least 1 hour and up to 1 week due to the small diameter of the oil drops and the use of caseinate as emulsifying agent. The emulsion can be dried using any conventional drying method, e.g. spray drying, modified spray drying, fluid bed drying or drum drying. Modified spray drying is preferred because lower process temperatures can be used and more spherical and dense particles can be obtained. Modified spray drying is preferably effected at an air temperature of between 40° C. and 140° C., more preferably between 60° C. and 100° C. As a spraying agent is preferably used corn starch, or milk protein powder, preferably casein powder, in an amount which corresponds to from 15 to 35% by weight, preferably from 20 to 25% by weight of the dry product. Conventional spray drying is prefer-ably effected at a temperature of from 140 to 300° C.

The invention further relates to the use of a microencapsulated oil or fat product containing at least 10% by weight of highly unsaturated fatty acids, preferably ω-3 and ω-6 fatty acids, or derivatives thereof dispersed in a matrix material comprising caseinate, preferably sodium, potassium and calcium caseinate, most preferably potassium caseinate, in dry or wet mixture with an infant formula, a health functional food, a dietetic food, a nutrient for diabetics, a protein cure for weakened patients, or a pharmaceutical.

The ratio in the oil or fat based on weights of AA and/or γ-linolenic acid, EPA and DHA is between 0:0:1 and 3:1:1, preferably about 0.1:0.1:1 and more preferably about 0.5:0.12:0.3, which is commonly found in human milk.

The oils used in the microencapsulated product of the invention are preferably fish oils having a high percentage of highly unsaturated fatty acids, preferably more than about 30% by weight, or borage oil having more than about 20% by weight of highly unsaturated fatty acids. Said oils are very susceptible to oxidation and also in comparison to vegetable oils, such as sunflower oil, having a high proportion of unsaturated fatty acids. The following test shows the duration of the induction period before oxidation takes place in a sample of various oils used in the product of the invention compared to typical vegetable oils used in infant formulas:

Oxidation test for oils
  Apparatus:
  Rancimat 617, Metrohm, Switzerland
  Test conditions:
  100° C./20l air per hour
  Results:
  Oil Duration
  15:15(EPA:DHA) fish oil 51 min
  5:25(EPA:DHA) fish oil 54 min
  18:12(EPA:DHA) fish oil 0 min
  Coconut oil >100 hours
  Sunflower oil 6 hours
  Peanut oil 11 hours The oxidation test shows that highly unsaturated oils, such as fish oils, are extremely susceptible to oxidation. Nevertheless, the microencapsulated product of the invention containing these susceptible oils are stable for at least one year as will appear from the following examples.

EXAMPLE 1

Potassium caseinate (40 g) was dissolved in water (380 g) having a temperature of 60° C. Maltodextrin DE 24-30 (80 g) was added and dissolved. The solution was de-oxygenised under vacuum and sodium ascorbate (16.2 g) was added. (90 g) of fish oil having a content and ratio of AA, EPA and DHA of 4%: 6%:23% was emulsified into the solution using a Rannie high-pressure homogenisator (Model MINI-LAB, type 8.30 H) at 800 bar to obtain oil drops in the emulsion whereof 95% have a diameter of from 0.01 to 2 µm.

This emulsion was stable for at least 2 days.

EXAMPLE 2

Example 1 was repeated using potassium caseinate (400 g), water (2933 g), maltodextrin DE 24-30 (1600 g), sodium ascorbate (249 g) and fish oil (1100 g) having a content and ratio of EPA and DHA of 15%:15%. The emulsion temperature was 68° C.

The emulsion was dried using a modified spray drying process at 80° C. under the supply of casein powder which constituted 20% of the dried product. The resulting product containing 25% fat or oil and 4% residual moisture has a particle size of from 10 to 600 µm and is stable for 2 years.

The fatty acid composition of a typical fish oil having a ratio of EPA and DHA of 15%:15% is as follows:

| Fatty acids | % | % of total fat |
|---|---|---|
| ω-n | | 38.6% |
| 18:3 | 0.7 | |
| 18:4 | 2.9 | |
| 20:4 | 1.2 | |
| 20:5 | 14.6 | |
| 21:5 | 0.6 | |
| 22:5 | 2.6 | |
| 22:6 | 16.0 | |
| Polyunsaturates other than ω-3 | | 11.6% |
| 16:3 | 1.1 | |
| 18:2 | 1.2 | |
| 20:4 ω-6 | 0.9 | |
| others | 8.4 | |
| Monounsaturates | | 19.0% |
| 16:1 | 8.2 | |
| 18:1 | 7.8 | |
| others | 3.0 | |
| Saturates | | 30.8% |
| 14:0 | 6.7 | |
| 16:0 | 18.3 | |
| others | 5.8 | |

EXAMPLE 3

Potassium caseinate (170 g) was dissolved in 1240 g of water at a temperature of 60° C.

Sodium ascorbate (30.6 g) was added and 170 g of fish oil was emulsified into the solution using a Rannie high-pressure homogenisator 3 times at 400 bar, 600 bar and 800 bar to obtain an average oil drop diameter of below 0.7 µm. The emulsion was dried as in Example 2 using an emulsion temperature of 60° C.

EXAMPLE 4

The effect of emulsifying at varying pressure using a high-pressure Rannie homogenisator (Model MINI-LAB, type 8.30 H) was tested and the results are given below:

The following ingredients were used as in Example 2:

| | |
|---|---|
| Water | 2933 g |
| Potassium caseinate | 400 g |
| Maltodextrin | 1600 g |
| Sodium ascorbate | 249 g |
| Fish oil, 15%:15% of EPA:DHA | 1100 g |

The emulsion was passed through the homogenisator 3 times.

TABLE

| Applied pressure, bar | Average oil drop diameter, µm | Maximum oil drop diameter, µm | Stability of emulsion at 60° C. h |
|---|---|---|---|
| 50 | 4 | 20 | 0.5 h |
| 100 | 3 | 10 | 1 h |
| 200 | .1–2 | 10 | at least 3 days |
| 230 | <0.7 | 4.0 | — |
| 270 | <0.7 | 4.0 | — |
| 300 | <0.7 | 4.0 | at least 3 days |
| 400 | <0.7 | 4.0 | at least 3 days |
| 600 | <0.7 | 3.0 | at least 3 days |

The average oil drop diameter was measured after 1 and 24 hours for emulsions prepared at 200, 300, 400 and 600 bar and no changes were observed. The effect of emulsifying at pressures above about 200 bar is that a stable emulsion is obtained through a small oil drop diameter, said diameter being stable for several hours. The oil drop diameter decreases with the use of increasing pressures and it can be expected that an upper limit of applied pressure only depends on the available equipment. The emulsion prepared at 50 bar was not satisfying due to separation after only ½ hour.

What is claimed is:

1. A dried microencapsulated oil or fat product, comprising at least one oil or fat dispersed in the matrix material as particles or drops having an average diameter of less than or equal to 2 µm, the oil or fat containing at least 10% by weight of highly unsaturated fatty acid, the level of free fatty acids being below 5.0% by weight, and the matrix material consisting of caseinate, said microencapsulated oil or fat product being stable for at least one year.

2. A dried microencapsulated product according to claim 1, wherein the oil or fat is a marine oil containing at least 30% by weight of ω-3 fatty acids.

3. A dried microencapsulated product according to claim 1, wherein the oil or fat is a vegetable oil containing at least 20% by weight of ω-3 and ω-6 fatty acids.

4. A dried microencapsulated product according to claim 1, wherein the oil or fat is natural, fermented, enzymatically reesterified, chemically modified or mixtures thereof; the matrix material comprises from 1 to 100% by weight caseinate and from 0 to 70% by weight of at least one carbohydrate selected from the group consisting of glucose syrup, maltodextrin, saccharose, maltose or lactose; from 0 to 10% by weight of at least one antioxidant selected from the group consisting of the vitamin antioxidants α-, β-, γ- and δ-tocopherols, ascorbic acid and derivatives thereof, carotenoids, and rosemary extract, and from 0 to 35% by weight of a spraying agent selected from the group consisting of corn starch, milk proteins, including casein, caseinate and whey proteins, preboiled or gelatinized starch, soy bean protein isolates, lactose, tricalcium phosphate, and calcium carbonate.

5. A dried microencapsulated product according to claim 4, which comprises from 20 to 35% by weight fat or oil, from 2 to 20% by weight caseinate, and from 20 to 70% by weight carbohydrate, from 5 to 6% by weight antioxidant, and from 20 to 25% of a spraying agent.

6. A dried microencapsulated product according to claim 4, wherein the oil is a fish oil, the caseinate is sodium, potassium, or calcium caseinate, preferably potassium caseinate, and the carbohydrate is maltodextrin or saccharose, and the antioxidant is selected from the group consisting of α, β, γ and ∂ tocopherols, ascorbic acid and derivatives thereof, and carotenoids.

7. A dried microencapsulated product according to claim 1, wherein the matrix material comprises a caseinate and carbohydrate in a weight ratio of from 1:4 to 1:1.

8. A process of preparing a microencapsulated product as defined in claim 1, which comprises homogenizing at a pressure of more than 200 bar a mixture of an oil or fat having a mixture of an oil or fat having a content of at least 10% highly unsaturated fatty acid and an aqueous solution of a caseinate, drying the resulting emulsion, and recovering the obtained free flowing microcapsules.

9. A microencapsulated oil or fat product, as defined in claim 1, wherein the ingredients further include at least one carbohydrate.

10. A microencapsulated oil or fat product, as defined in claim 1, wherein the highly unsaturated fatty acids are selected from the group consisting of ω-3 and ω-6 fatty acids.

11. An edible fat product for incorporation into a dry or wet formula suitable for feeding infants, said product comprising a dried microencapsulated oil or fat product wherein the oil or fat contains at least 10% by weight of highly unsaturated fatty acids which is dispersed in a matrix material comprising caseinate.

12. An edible fat product as defined in claim 11, wherein the oil or fat contains less than 20% by weight of EPA and more than 15% by weight of DHA.

13. An edible fat product as defined in claim 11, wherein the ratio of AA, EPA, and DHA in the oil or fat is from 0.1:0.1:1 to 3:1:1.

14. An edible fat product as defined in claim 11, wherein the ratio of AA and τ-linolenic acid, EPA, and DHA in the oil or fat is from 0.1:0.1:1 to 3:1:1.

15. An edible fat product as defined in claim 11, wherein the ratio of τ-linolenic acid, EPA, and DHA in the oil or fat is from 0.1:0.1:1 to 3:1:1.

16. A pharmaceutical composition comprising a dried microencapsulated oil or fat product wherein the oil or fat contains at least 10% by weight of highly unsaturated fatty acids which is dispersed in a matrix material comprising caseinate, and a pharmaceutically acceptable carrier.

17. A method for administering a pharmaceutically effective amount of an oil or fat product which comprises administering to a patient in need thereof a microencapsulated product prepared by homogenizing at a pressure of more than 200 bar a mixture of an oil or fat having a content of at least 10% highly unsaturated fatty acids and an aqueous solution of a caseinate, drying the resulting emulsion, and recovering the obtained free flowing microcapsules.

18. A method for administering a pharmaceutically effective amount of an oil or fat product as defined in claim 17, wherein materials being homogenized include a carbohydrate containing matrix material.

19. Process according to claim 18, wherein the mixture is homogenised at a pressure of at least 230 bar, preferably at least 300 bar.

* * * * *

UNITED STATES PATENT AND TRADEMARK OFFICE
CERTIFICATE OF CORRECTION

PATENT NO. : 6,444,242 B1
DATED : September 3, 2002
INVENTOR(S) : Skelbaek et al.

It is certified that error appears in the above-identified patent and that said Letters Patent is hereby corrected as shown below:

Column 8,
Lines 35 and 36, delete ", said microencapsulated oil or fat product being stable for at least one year --.
Line 42, "3 and" should be -- 3, --.

Column 9,
Line 2, "γand δtocopherols" should be -- γ and, δ tocopherols --.

Signed and Sealed this

Nineteenth Day of November, 2002

Attest:

Attesting Officer

JAMES E. ROGAN
*Director of the United States Patent and Trademark Office*